United States Patent [19]
Miyahara

[11] Patent Number: 5,154,863
[45] Date of Patent: Oct. 13, 1992

[54] ALUMINUM NITRIDE-BASED SINTERED BODY AND PROCESS FOR THE PRODUCTION THEREOF

[75] Inventor: Kenichiro Miyahara, Kokubu, Japan

[73] Assignee: Kyocera Corporation, Kyoto, Japan

[21] Appl. No.: 770,336

[22] Filed: Oct. 3, 1991

Related U.S. Application Data

[60] Division of Ser. No. 150,080, Jan. 29, 1988, Pat. No. 5,077,245, which is a continuation-in-part of Ser. No. 924,916, Oct. 29, 1986, abandoned.

[30] Foreign Application Priority Data

| Oct. 31, 1985 | [JP] | Japan | 60-244647 |
| Nov. 25, 1985 | [JP] | Japan | 60-265692 |
| Jan. 31, 1986 | [JP] | Japan | 61-020721 |
| Apr. 18, 1986 | [JP] | Japan | 61-088265 |
| Aug. 26, 1986 | [JP] | Japan | 61-200803 |
| Jan. 30, 1987 | [JP] | Japan | 62-020779 |

[51] Int. Cl.$^5$ .................... C04B 35/58; C04B 35/50
[52] U.S. Cl. .......................... 264/65; 501/96
[58] Field of Search .............. 264/65; 501/96

[56] References Cited

U.S. PATENT DOCUMENTS

| 4,591,537 | 5/1986 | Aldinger et al. | 428/698 |
| 4,698,320 | 10/1987 | Kasori et al. | 501/96 |
| 4,711,861 | 12/1987 | Sawamura et al. | 501/98 |
| 4,719,187 | 1/1988 | Bardhan et al. | 501/97 |

FOREIGN PATENT DOCUMENTS

| 60-71575 | 4/1985 | Japan | 501/98 |
| 60-77176 | 5/1985 | Japan | 501/98 |
| 60-127208 | 7/1985 | Japan | . |
| 60-151280 | 8/1985 | Japan | 501/96 |
| 60-151281 | 8/1985 | Japan | 501/96 |
| 61-21978 | 1/1986 | Japan | 501/98 |
| 61-146766 | 7/1986 | Japan | 501/98 |
| 61-200605 | 9/1986 | Japan | . |
| 61-205670 | 9/1986 | Japan | . |
| 61-227967 | 10/1986 | Japan | . |
| 896766 | 5/1962 | United Kingdom | . |
| 2127709 | 4/1984 | United Kingdom | . |

OTHER PUBLICATIONS 61-261270, Nov. 1986 Japan.
62-17076, Jan. 1987 Japan.
62-52180, Mar. 1987 Japan.
62-105961, May 1987 Japan.

*Primary Examiner*—Mark L. Bell
*Attorney, Agent, or Firm*—Spensley Horn Jubas & Lubitz

[57] ABSTRACT

An aluminum nitride-based sintered body having a thermal conductivity of greater than 110 W/mK and a relative density of at least 90% and a process for the production thereof are disclosed. The sintered body contains minor amounts of at least one compound of a Group IIa metal and at least one compound of a Group IIIa metal of the Periodic Table and can be produced from an aluminum nitride starting powder prepared by direct nitriding of metallic aluminum powder and having a purity of at lest 99%, an oxygen content of lower than 1.8%, and an Si content of at most 1.0% by mixing the starting powder with powdery sintering additives consisting of at least one metal or compound of a Group IIa metal such as Ca and at least one metal or compound of a Group IIIa metal such as Y, shaping the powder mixture, and baking the shaped mixture at a relatively low temperature.

7 Claims, 1 Drawing Sheet

ALUMINUM NITRIDE-BASED SINTERED BODY AND PROCESS FOR THE PRODUCTION THEREOF

CROSS REFERENCES TO RELATED APPLICATIONS

This is a division of application Ser. No. 07/150,080, filed on Jan. 29, 1988, now U.S. Pat. No. 5,077,245, which is a continuation-in-part of application Ser. No. 06/924,916 filed Oct. 29, 1986, now abandoned.

BACKGROUND OF THE INVENTION

1. Field of the Invention

The present invention relates to an aluminum nitride-based sintered body having high thermal conductivity which is produced by baking at a relatively low temperature. More particularly, it relates to an aluminum nitride-based sintered body which comprises as a sintering additive a combination of a compound of a Group IIa metal and a compound of a Group IIIa metal of the Periodic Table, and also to a method of producing the same.

2. Description of the Prior Art

As a result of the progress in large-scale integration in recent years, there is an increasing demand for insulated substrates having high thermal conductivity in order to mount semiconductor elements generating large amounts of heat such as high-density integrated circuits, power transistors, laser diodes, and the like.

Sintered bodies based on beryllium oxide or beryllia (BeO) have conventionally been used as ceramic materials having high thermal conductivity, but their toxicity prevents their use in a wide variety of applications.

As a substitute for beryllia, aluminum nitride (AlN) has been used in the production of substrates of high thermal conductivity because it is stable and has high thermal conductivity in addition to good high-temperature strength and electrically insulating properties.

Although aluminum nitride possesses properties which make it suitable for use in the production of semiconductor substrates, it suffers from the problem that it is difficult to sinter. Since it is difficult to sinter an aluminum nitride powder alone in order to obtain a shaped article, it is conventionally sintered with the aid of a sintering additive, which is mixed with an aluminum nitride powder prior to shaping. Sintering additives which are known to be suitable for this purpose include compounds of Group IIa metals (alkaline earth metals), Group IIIa metals (rare earth metals), and Group IIIb metals (aluminum group metals) of the Periodic Table such as $Y_2O_3$ (yttrium oxide or yttria), CaO (lime or calcium oxide), and $CaC_2$ (calcium carbide). See Japanese patent Laid-Open applications Nos. 59-207184, 60-60910, 60-65768, 60-71575, 60-127267, 60-178688, and 50-23411, as well as Huseby et al., U.S. Pat. Nos. 4,578,232, 4,578,233, 4,578,234, 4,578,364, and 4,578,365, and Aldinger et al., U.S. Pat. Nos. 4,591,537 and 4,627,815.

However, none of these prior art references discloses that a particular combination of two or more sintering additives provides superior results.

Huseby et al. in the above mentioned U.S. patents employs a complicated process in which free carbon or a carbonaceous material is added to a mixture of the starting powder of aluminum nitride and a sintering additive, and the mixture is shaped and baked. Addition of free carbon or a carbonaceous material is effective in reducing the oxygen content of the sintered body, thereby increasing the thermal conductivity thereof. However, the presence of a substantial amount of free carbon during baking causes a reaction of carbon with a sintering additive to form a carbide, e.g., $YC_x$. The carbide, in turn, reacts with oxygen and/or moisture in air after baking, thereby causing deposition of $Y_2O_3$ on the surface of the sintered body and remarkably roughening the surface. Therefore, the surface of the sintered body has to be abraded prior to use so as to obtain a smooth surface. This adds an extra step of abrasion and deteriorates the water resistance of the sintered body. In addition, a relatively high baking temperature is required in the presence of free carbon, which is disadvantageous from the viewpoint of economy. Japanese patent Laid-Open application No. 61-117160 discloses an aluminum nitride sintered body comprising as sintering additives a rare earth metal compound and an alkaline earth metal compound. The sintered body is prepared by adding to an aluminum nitride starting compound a rare earth metal compound and an alkaline earth metal compound in a total amount of from 0.01 to 20% by weight calculated as oxides based on the weight of the aluminum nitride powder, followed by shaping and baking. The amounts of the sintering additives present in the sintered body product are not specifically mentioned in the application. It is estimated that the calcium content of the sintered body is extremely low, because it is known that calcium oxide tends to readily vaporize during baking at a high temperature and its content may be decreased to about from one-tenth to one-hundredth of its initial content upon baking depending on the baking conditions. The aluminum nitride sintered body disclosed in the above laid-open application can be prepared by baking at a relatively low temperature of 1700° C. or below and is described as having a high density and a high thermal conductivity. However, the thermal conductivity actually obtained in the sintered body is 110 W/mK at most.

The theoretical thermal conductivity of aluminum nitride is as high as about 320 W/mK. On the other hand, an aluminum nitride sintered body obtained by baking a mixture of aluminum nitride powder and a sintering additive has a thermal conductivity which is, in general, significantly lower than the value expected from the thermal conductivities of aluminum nitride and the sintering additive due to the presence of oxygen and other impurities in the sintered body and the presence of grain boundaries. For example, sintered bodies of aluminum nitride presently available on the market have a thermal conductivity on the order of 100 W/mK or less. Accordingly, there is room for improvement in the thermal conductivity of an aluminum nitride sintered body, and such improvement is highly desired.

There are two well-known methods for preparing aluminum nitride powder. One is the direct nitriding method in which metallic aluminum powder is directly nitrided with nitrogen or ammonia gas. The other is the alumina reduction method in which alumina powder is mixed with carbon and baked in nitrogen or ammonia gas to effect reduction of alumina and nitriding simultaneously.

In the direct nitriding method, the aluminum nitride powder product can be prepared inexpensively because the process is relatively simple compared to the alumina reduction method. Therefore, it is advantageous from the viewpoint of economy to use an aluminum nitride starting powder prepared by the direct nitriding method. However, it is usually contaminated in an amount of at least a few percent by weight with cationic impurities which enter the product from the grinding vessel or grinding media in the step of grinding the starting metallic aluminum material in order to increase the efficiency of nitriding or in the step of pulverizing the aluminum nitride powder formed by nitriding in order to reduce the particle size to one suitable for use in shaping and sintering. The pulverization of the aluminum nitride powder is usually required since a considerable portion of the powder is agglomerated after nitriding. Also in the pulverization of the aluminum nitride powder, the surface of the powder is oxidized to a certain degree, and therefore the aluminum nitride powder product obtained by the direct nitriding method usually contains oxygen in an amount of at least 2% by weight, and in most cases at least 3% by weight. Such aluminum nitride powder containing oxygen and cationic impurities in such relatively large amounts is not suitable for use as a starting material to produce high-quality aluminum nitride sintered bodies. For this reason, there is only limited use for aluminum nitride powder obtained by the direct nitriding method in the production of sintered bodies having high thermal conductivity with the aid of a sintering additive.

In the alumina reduction method, since agglomeration of particles does not occur significantly during nitriding, the starting alumina can be previously pulverized to the desired particle size prior to reduction and nitriding, and the resulting aluminum nitride powder can be used without further pulverization. Thus, according to this method, aluminum nitride powder having an average particle diameter of 2 μm or less can be obtained and it can be directly used as a starting powder in the production of sintered bodies. Because there is no pulverization step after nitriding, aluminum nitride powder prepared by the alumina reduction method is relatively pure. Its content of cationic impurities can be readily decreased to 0.5% by weight or less, and its oxygen content is usually at most 3% by weight. In view of these advantages, in the production of aluminum nitride sintered bodies in accordance with the prior art, aluminum nitride powder obtained by the alumina reduction method has been used in most cases as a starting powder to be sintered with the aid of a sintering additive.

However, as mentioned above, most of the aluminum nitride sintered bodies obtained by conventional methods from the above-mentioned relatively pure starting powder prepared by the alumina reduction method exhibit relatively low values for thermal conductivity on the order of 100 W/mK or lower.

SUMMARY OF THE INVENTION

It is an object of the present invention to provide a highly dense aluminum nitride sintered body having high thermal conductivity of greater than 110 W/mK.

It is another object of the present invention to provide a highly dense aluminum nitride sintered body having high thermal conductivity which can be prepared by baking at a relatively low temperature and which is suitable for mass production.

A further object of the present invention is to provide a process for the production of a highly dense aluminum nitride sintered body of high thermal conductivity from an aluminum nitride starting powder prepared by the direct nitriding method.

A still further object of the present invention is to provide a highly dense aluminum nitride sintered body of high thermal conductivity which contains at least one compound of a Group IIa metal and at least one compound of a Group IIIa metal which come from sintering additives.

Other objects as well as the nature and advantages of the present invention will be apparent to those skilled in the art from the following description and examples.

It has surprisingly been found that an aluminum nitride sintered body having a thermal conductivity of greater than 110 W/mk can be obtained by using as sintering additives at least one metal or compound of a Group IIa metal (alkaline earth metal) such as CaO and at least one metal or compound of a Group IIIa metal (rare earth metal) such as $Y_2O_3$ provided that the impurity oxygen content and silicon content of the resulting sintered body are controlled so as not to exceed predetermined respective maximum limits. As a result, the above objects can be accomplished.

In one aspect, the present invention provides an aluminum nitride-based sintered body which comprises a major amount of aluminum nitride and minor amounts of at least one compound of a Group IIa metal and at least one compound of a Group IIIa metal of the Periodic Table and which has a thermal conductivity of greater than 110 W/mK and a relative density of at least 90%, wherein the Group IIa metal compound is present in an amount sufficient to provide a content of the Group IIa metal of from 0.01 to 5.0% by weight calculated as an oxide, the Group IIIa metal compound is present in an amount sufficient to provide a content of the Group IIIa metal of from 0.01 to 10.0% by weight calculated as an oxide, the residual oxygen content of the sintered body, which is calculated by subtracting the total amount of oxygen which can be bound to the Group IIa metal and the Group IIIa metal present in the sintered body as an oxide of each metal from the total oxygen content of the sintered body, is not greater than 5.0% by weight, and the Si content of the sintered body is not greater than 1.0% by weight, all the percentages being based on the weight of the sintered body.

In another aspect, the present invention provides a process for producing an aluminum nitride-based sintered body having a thermal conductivity of greater than 110 W/mK and a relative density of at least 90%, which comprises the steps of: mixing an aluminum nitride starting powder with minor amounts of at least one class selected from Group IIa metals and compounds of these metals and at least one class selected from Group IIIa metals and compounds of these metals as sintering additives to form a powder mixture, the aluminum nitride starting powder being prepared by direct nitriding of metallic aluminum and having a purity of at least about 99%, an oxygen content of lower than 1.8% by weight, and an Si content of not greater than 1.0% by weight; shaping the powder mixture; and baking the shaped mixture at a temperature in the range of 1500°–1900° C. in a non-oxidizing atmosphere for a length of time sufficient to sinter the mixture.

In a preferred embodiment, the sintering additives consists of at least one calcium (Ca) compound and at least one yttrium (Y) compound, and the powder mixture being baked consists essentially of the aluminum nitride starting powder and the sintering additives without addition of free carbon or a carbonaceous substance.

In copending application Ser. No. 924,916 filed on Oct. 29, 1986 which is the parent application of the subject continuation-in-part application, there is provided an aluminum nitride sintered body having a thermal conductivity of at least 100 W/mK, preferably at least 120 W/mK, more preferably at least 140 W/mK, and most preferably at least 160 W/mK and a relative density of at least 95% which is prepared by shaping and baking an aluminum nitride starting powder together with a sintering additive selected from the group consisting of compounds of Group IIa, IIIa, and IIIb metals of the Periodic Table, as well as a method for the production thereof. The sintered body disclosed therein is characterized by having a $Y_2O_3$-converted yttrium content and a residual oxygen content which lie in predetermined ranges, the residual oxygen content being calculated by subtracting the amount of oxygen contained in the $Y_2O_3$-converted yttrium content from the total oxygen content. Although the sintered body disclosed therein is excellent with respect to properties including its thermal conductivity, relative density, and mechanical strength, it is necessary to carry out the baking at a relatively high temperature due to the use of an yttrium compound which is generally used as the sole sintering additive. Therefore, in order to lower the production cost, it is desirable to obtain an aluminum nitride sintered body which has excellent properties comparable to those of the just-described sintered body and which is prepared by baking at a lower temperature.

DESCRIPTION OF THE PREFERRED EMBODIMENTS

Figure 1:
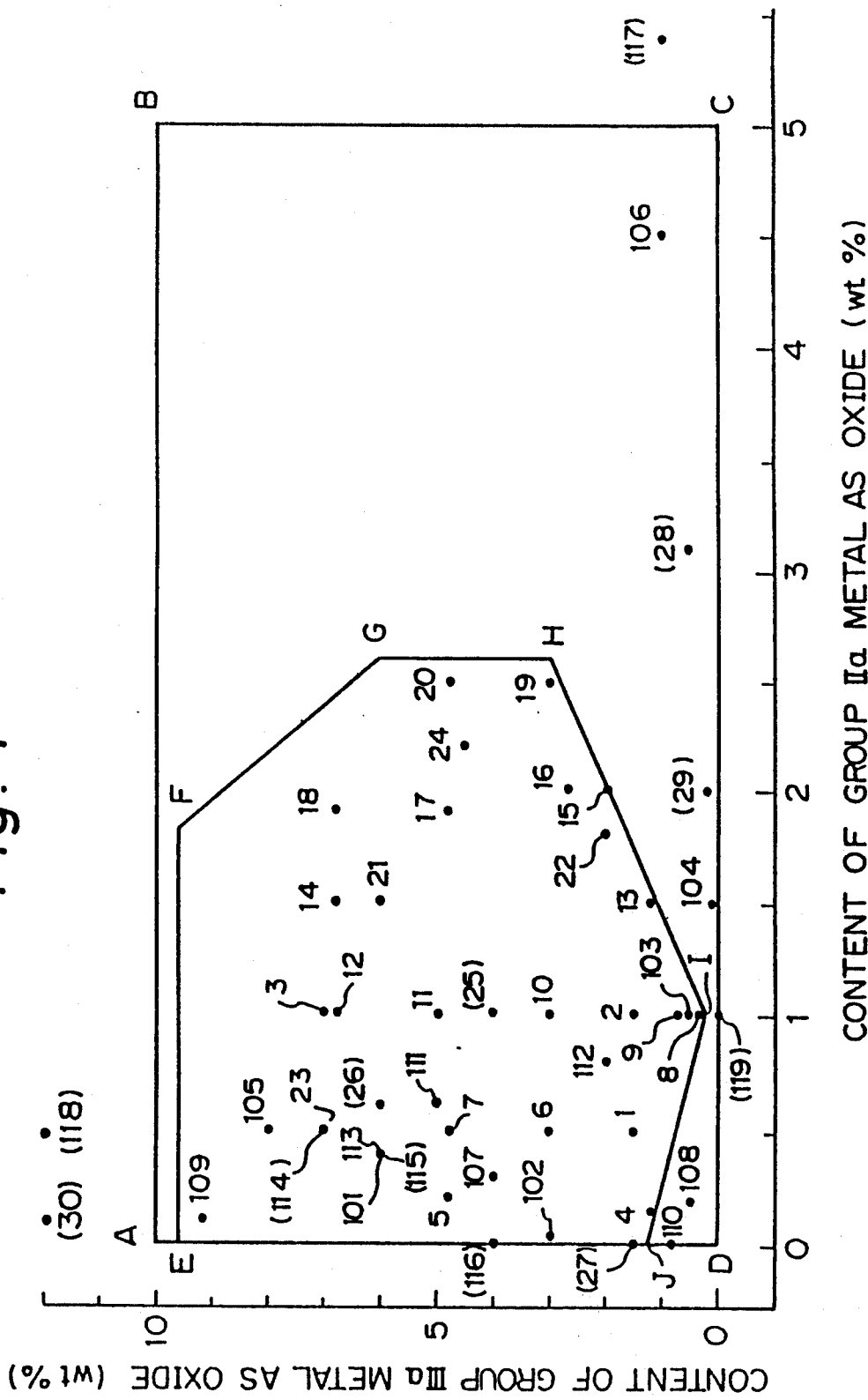
FIG. 1 is a graph showing the content of a Group IIa metal (alkaline earth metal) as an oxide (abscissa) and the content of a Group IIIa metal (a rare earth metal) as an oxide (ordinate) in the sintered bodies prepared in the Example, in which the reference numerals indicate the numbers of the samples shown in Table 1.

The aluminum nitride-based sintered body of the present invention (hereinafter referred to simply as "aluminum nitride sintered body") contains at least one compound of a Group IIa metal and at least one compound of a Group IIIa metal, all derived from the ingredients added as sintering additives.

The compound of a Group IIa metal, i.e., an alkaline earth metal, present in the sintered body includes compounds of magnesium (Mg), calcium (Ca), strontium (Sr), and barium (Ba). Preferably it is a Ca, Sr, or Ba compound, and more preferably it is a Ca compound. As a sintering additive, one or more classes selected from these metals and compounds thereof may be used. Compounds of Group IIa metals useful as a sintering additive include carbonates, nitrates, oxalates, hydroxides, carbides, nitrides, carbo-nitrides, halides, carboxylates, and the like. Specific examples of Group IIa metal compounds suitable for use as a sintering additive include CaO, $CaCO_3$, $CaC_2$, $Ca_3N_2$, $CaCN_2$, $Ca(NO_3)_2 \cdot 4H_2O$, $CaF_2$, $CaCl_2$, BaO, $BaCO_3$, SrO, $SrCO_3$, $SrSO_4$, $Ca\partial CH_3(CH_2)_{16}COO[_2$, and $Sr\partial CH_3(CH_2)_{16}COO[_2$. Particularly preferred as a sintering additive are CaO, $CaCO_3$ and $CaC_2$.

Examples of the Group IIIa metal compound, i.e., rare earth metal compound, present in the sintered body include compounds of Y, La, Yb, Ho, Eu, Dy, Sm, Lu, Nd, Gd, Er, Ce, Pr, Tm, and Sc. Preferably they are compounds of Y, Yb, Ho, Eu, Dy, Sm, Lu, Nd, Gd, and Er. Most preferably, an yttrium compound is present in the sintered body. As a sintering additive, one or more classes selected from these metals and compounds thereof may be used. Compounds of Group IIIa metals which are useful as a sintering additive include carbonates, nitrates, oxalates, hydroxides, carbides, nitrides, carbo-nitrides, halides, and the like. Specific examples of group IIIa metal compounds which are suitable for use as a sintering additive include $Y_2O_3$, and oxides of lanthanoid metals, e.g., $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. Particularly preferred as a sintering additive is $Y_2O_3$.

These sintering additives react with the aluminum nitride powder mixed therewith or an impurity present therein during baking to form various compounds, in most cases in the form of double oxides of the metals with $Al_2O_3$, which are deposited on the aluminum nitride grains to form grain boundary phases, thereby binding the aluminum nitride powder and resulting in the formation of a dense sintered body. Examples of calcium compounds which can be found in the grain boundary phases of an aluminum nitride sintered body are $CaO.6Al_2O_3$, $CaO.2Al_2O_3$, $CaO.Al_2O_3$, and the like, while examples of yttrium compounds which can be found in the grain boundary phases thereof are $3Y_2O_3.5Al_2O_3$, $Y_2O_3.Al_2O_3$, $2Y_2O_3.Al_2O_3$, and the like.

According to the present invention, an aluminum nitride sintered body having a thermal conductivity exceeding 110 W/mK can be obtained when the compounds of Group IIa and Group IIIa metals are present in the sintered body in amounts such that the sintered body has a content of the Group IIa metal in the range of from 0.01 to 5.0% by weight calculated as a simple oxide such as CaO and a content of the Group IIIa metal in the range of from 0.01 to 10.0% by weight calculated as a simple oxide such as $Y_2O_3$, both weight percents being based on the weight of the sintered body. The contents of these metals calculated as oxides are within the rectangular region confined by lines A-B-C-D-A shown in FIG. 1. The contents as an oxide of a Group IIa metal and a Group IIIa metal at points A, B, C, and D in FIG. 1 are as follows:

| Point | Content of Group IIa metal as oxide | Content of Group IIIa metal as oxide |
| --- | --- | --- |
| A | 0.01% by weight | 10.0% by weight |
| B | 5.0% by weight | 10.0% by weight |
| C | 5.0% by weight | 0.01% by weight |
| D | 0.01% by weight | 0.01% by weight |

The content as an oxide of the Group IIa metal is preferably from 0.01 to 3.0% by weight and more preferably from 0.03 to 2.6% by weight, while the content as an oxide of the group IIIa metal is preferably from 0.1 to 10.0% by weight and more preferably from 0.23 to 9.6% by weight.

When the Group IIa metal is calcium (Ca) and the Group IIIa metal is yttrium (Y), the Ca and Y compounds are preferably present in the sintered body in amounts such that the Ca content of the sintered body is in the range of from 0.01 to 2.6% calculated as CaO, and Y content thereof is in the range of from 0.23 to 9.6% by weight calculated as $Y_2O_3$. More preferably, the Ca content as CaO and the Y content as $Y_2O_3$ are within the region confined by lines E-F-G-H-I-J-E in FIG. 1. Most preferably, the Ca content is from 0.1 to 2.5% by weight as CaO and the Y content is from 0.3 to 8.0% by as $Y_2O_3$. At each of Points E–J, the Ca content as CaO and the Y content as $Y_2O_3$ are as follows:

| Point | Ca content as CaO | Y content as $Y_2O_3$ |
|---|---|---|
| E | 0.01% by weight | 9.6% by weight |
| F | 1.8% by weight | 9.6% by weight |
| G | 2.6% by weight | 6.0% by weight |
| H | 2.6% by weight | 3.0% by weight |
| I | 1.0% by weight | 0.23% by weight |
| J | 0.01% by weight | 1.22% by weight |

If the content of one of the Group IIa and Group IIIa metals in the sintered body is less than 0.01% by weight as an oxide, sintering can not be effected to a satisfactory degree, resulting in the formation of a sintered body having inadequate density and strength and decreased thermal conductivity. On the other hand, in a sintered body having a Group IIa metal content in an amount of more than 5% by weight calculated as a simple oxide, the thermal conductivity is also decreased and its density is slightly decreased. A decrease in thermal conductivity is also observed when the content of a Group IIIa metal is more than 10% by weight as an oxide. In any of these cases, it is difficult to obtain an aluminum nitride sintered body having a thermal conductivity of greater than 110 W/mK.

It has also been found that even if the content of each of the Group IIa and IIIa metals is within the range defined above, the presence of silicon and residual oxygen in the sintered body in excessively large amounts decreases the thermal conductivity and it is difficult to obtain a sintered body having a thermal conductivity of greater than 110 W/mK.

The term "residual oxygen" or "residual oxygen content" used herein indicates the difference between the total oxygen content of the sintered body and the total amount of oxygen which can be bound to the Group IIa and IIIa metals present in the sintered body as an oxide of each metal. The residual oxygen content can be considered to be indicative of the amount of oxygen originating from impurities.

The phase structure of an aluminum nitride sintered body which is produced with the aid of sintering additives consists of AlN grain phases and grain boundary phases which bind the AlN grain phases together. The exact composition of the crystalline substances present in the grain boundary phases varies depending on various factors including the type of the sintering additive, the purity of the aluminum nitride starting powder, the baking temperature and atmosphere, and the like, and the thermal conductivity of an aluminum nitride sintered body greatly depends on the composition of the grain boundary phases. In the sintered body, oxygen is predominantly present in the grain boundary phases in the form of oxides. Part of this oxygen present in the grain boundary phases originates from the sintering additives and the remaining oxygen comes from impurities. The oxygen coming from impurities may be in the form of $Al_2O_3$ formed by oxidation of the AlN starting powder or in the form of oxides of cationic impurities which are initially present in the starting powder or incorporated in some step of the production of the sintered body. The oxygen content coming from impurities can be estimated by the residual oxygen content, which is calculated by substracting the total amount of oxygen which can be bound to the Group IIa metal and the Group IIIa metal present in the sintered body as an oxide of each metal from the total oxygen content of the sintered body. The total amount of oxygen which can be bound to the Group IIa metal and the Group IIIa metal as an oxide can be calculated from the content of the Group IIa metal [M] and that of the Group IIIa [M'] which can be determined by elemental analysis. Based on the metal contents [M] and [M'], the amounts of oxygen which can be bound typically as [MO] and [M'$_2O_3$], respectively, are calculated and the sum of these oxygen amounts is the total amount of oxygen which can be bound to the Group IIa metal and the Group IIIa metal as an oxide.

It has been found that when the residual oxygen content of an aluminum nitride sintered body as determined above is not greater than 5.0% by weight, it is assured that the sintered body has high thermal conductivity. The residual oxygen content is preferably not greater than 4.5% and more preferably not greater than 3.0% by weight.

Among cationic impurities which may be present in the grain boundary phases of an aluminum nitride sintered body, silicon compounds will usually constitute a major proportion. Silicon will inevitably enter the starting powder during pulverization. As the silicon content of an aluminum nitride sintered body increases, it tends to have a decreased thermal conductivity. Although it is not intended to confine to any particular theory, it is believed that Si present in the starting powder may react with AlN and impurity oxygen and dissolve in AlN as a solid solution, resulting in the formation of an AlN polytype (SIALON, Al—Si—O—N) during baking. The AlN polytype thus formed is known to facilitate grain growth and tends to form fibrous structures in the sintered body, resulting in deterioration in the thermal conductivity of the sintered body. Therefore, in order to assure that the aluminum nitride sintered body has satisfactory thermal conductivity the Si content of the sintered body is restricted to not greater than 1.0%, preferably not greater than 0.9%, and most preferably not greater than 0.5% by weight.

When the Group IIa metal is Ca and the Group IIIa metal is Y, the residual oxygen content of the sintered body is preferably at most 3% by weight and more preferably at most 2.7% by weight, while the silicon content thereof is preferably at most 0.7% by weight and more preferably at most 0.4% by weight.

The relative density of the aluminum nitride sintered body is at least 90%. If it has a relative density less than 90%, it is difficult to obtain the desired high thermal conductivity and its strength is also deteriorated. Preferably the sintered body has a relative density of at least 92% and more preferably at least 95%. When the Group IIa metal is Ca and the Group IIIa metal is Y, the relative density is preferably at least 92% and more preferably at least 95%.

The aluminum nitride sintered body of the present invention is preferably produced from an aluminum nitride starting powder prepared by the direct nitriding method, i.e., nitriding of metallic aluminum powder, since it is significantly less expensive than a starting powder prepared by the alumina reduction method. The starting powder used should be of high purity on the order of 99% or higher and its oxygen content and silicon content should be lower than 1.8% and not greater than 1.0% by weight, respectively. Of course, an aluminum nitride starting powder prepared by the alumina reduction method may be used as long as the purity, oxygen content, and silicon content thereof meet the above requirements.

The oxygen content of an aluminum nitride starting powder is the sum of the content of combined oxygen which is present in the form of oxides or other compounds, plus the content of oxygen which is dissolved in AlN in the form of a solid solution.

The term "purity" of an aluminum nitride starting powder used herein is the value calculated by subtracting the total content (in weight percent) of cationic impurities from 100 percent. The total content of cationic impurities is calculated by subtracting the sum of the contents of Al, N, O (oxygen), and adsorbed water from 100% and these contents can be determined by analysis, such as by means of ICP (induction coupled plasma) emission spectroscopic analysis or atomic absorption analysis. Thus, at least 99% purity of a starting powder indicates that the total content of cationic impurities is not greater than 1%. Such cationic impurities include Fe, C, Si, Ti, V, Cr, Mn, Ca, Mg, Co, Ni, and the like.

In many cases silicon comprises a major proportion of the cationic impurities, and the presence of an excessive amount of silicon tends to decrease the thermal conductivity as mentioned above. Too much oxygen in the starting powder contributes to an increase in the residual oxygen content of the sintered body, which also decreases the thermal conductivity. According to the present invention, therefore, an aluminum nitride starting powder having a purity, oxygen content and silicon content as defined above is used.

The high-purity aluminum nitride starting powder useful in the present invention can be obtained by the direct nitriding method using aluminum powder of high purity (preferably of at least 98.5% purity) as follows. The aluminum powder is heated in ammonia gas or nitrogen to effect nitriding, and the resulting aluminum nitride powder is pulverized either in a non-oxidizing atmosphere such as nitrogen, argon, helium, carbon monoxide, or hydrogen, or in an organic solvent to reduce the particle size to a desired level. Commercially-available high-purity aluminum nitride powder can be used provided that its purity and oxygen and silicon contents satisfy the above-mentioned requirements.

The pulverization of aluminum nitride powder is preferably conducted in an organic solvent, since it tends to minimize contamination of the powder with cationic impurities during pulverization. Any organic solvent may be used for this purpose irrespective of whether it is polar or non-polar. Examples of useful solvents include alcohols, ketones, aldehydes, aromatic hydrocarbons and paraffinic hydrocarbons. Such pulverization may be applied to a powder mixture, i.e., after the aluminum nitride powder is mixed with sintering additives.

A suitable average particle diameter of the aluminum nitride starting powder is not greater than 5 $\mu$m. If the starting powder has an average particle diameter exceeding 5 $\mu$m, the resulting sintered body will tend to have decreased thermal conductivity, relative density, and bending strength. Preferably the average particle diameter of the starting powder is within the range of from 1 to 3 $\mu$m.

According to the process of the present invention, the above-mentioned aluminum nitride starting powder prepared by the direct nitriding method is mixed with appropriate amounts of powdery sintering additives consisting of at least one class selected from Group IIa metals and their compounds and at least one class selected from Group IIIa metals and their compounds to form a powder mixture. The powder mixture is then shaped and baked at a temperature of from 1500° to 1900° C. in a non-oxidizing atmosphere for a time sufficient to form the desired sintered body.

The amounts of the sintering additives which consist of at least one of a Group IIa metal and a compound thereof and at least one of a Group IIIa metal and a compound thereof used in the preparation of the sintered body are so selected that the sintered body obtained upon baking has a Group IIa metal and IIIa metal contents which fall within the respective ranges defined above. In general, the loss of Group IIIa metal compounds, particularly yttrium compounds, by vaporization during baking is not relatively significant, while the loss of Group IIa metal compounds, particularly calcium compounds, is relatively significant. In any event, the amounts of the sintering additives to be added to the starting AlN powder should be determined by experiments.

It is preferable to use sintering additives having an average particle diameter in the range of from about 0.5 $\mu$m to about 3 $\mu$m.

In order to assure the formation of a sintered body having a thermal conductivity greater than 110 W/mK, it is preferable to use a powder mixture having an average particle diameter of at most 3 $\mu$m.

Mixing of the aluminum nitride starting powder with the sintering additives may be conducted by dry mixing in a non-oxidizing atmosphere or by wet mixing in water or in an organic solvent. Wet mixing using an alcohol, ketone, aromatic hydrocarbon, or similar organic solvent is preferred. If necessary, the powder mixture may be pulverized during the mixing to reduce the particle size to a desired level.

The shaping and baking of the powder mixture may be carried out in a conventional manner. For example, a minor amount (at most 20% by weight in total) of one or more of suitable binders such as paraffin wax, stearic acid, polymethylmethacrylate, methyl methacrylate/ethyl acrylate copolymer, and polyvinylbutyral may be added to the powder mixture as required and shaped into the desired configuration by a conventional technique such as dry pressing, rubber pressing, extrusion, injection molding, or the doctor blade sheet formation process. The shaped green body is then baked in a non-oxidizing atmosphere at subatmospheric, atmospheric, or super-atmospheric pressure. The atmosphere may be that of an inert gas such as nitrogen, argon, or helium, which may contain hydrogen or other reducing gas. The shaping and baking may be conducted simultaneously, by hot pressing, for example. When a binder is used in the shaping step, the shaped green body may be heated prior to baking so as to remove the binder.

According to the present invention, it is not necessary to add free carbon or a carbonaceous substance to the powder mixture being baked as proposed in the previously mentioned U.S. patents by Huseby et al., since the starting powder which is used has a low oxygen content. The presence of a substantial amount of free carbon or a carbonaceous substance during baking involves the above-mentioned disadvantages, and it is preferable to carry out the baking without addition of carbon.

The baking temperature depends on the shaping and sintering techniques which are employed, and it is generally within the range of 1500°–1900° C. If it is lower than 1500° C., the resulting sintered body will not be adequately dense. At a baking temperature higher than 1900° C., significant sublimation or decomposition of AlN grains will tend to take place. When the shaped green body is baked by the pressureless sintering technique, the baking temperature is preferably in the range of from 1550° to 1850° C.

The aluminum nitride sintered body according to the present invention which comprises at least one compound of a Group IIa metal and at least one compound of a Group IIIa metal derived from sintering additives has a high thermal conductivity which exceeds 110 W/mK, a relative density of at least 90%, and a satisfactory flexural strength. Also it has improved adhesion to metals. Therefore, the sintered body of the present invention is quite suitable for use as an insulated substrate for mounting semiconductor elements which generate large amounts of heat. It is also suitable for use in ceramic heaters.

The following example is given as specific illustrations of the present invention. It should be noted, however, that the specific details set forth in the example are merely illustrative and are in no manner meant to be restrictive. In the example, all the percents are by weight unless otherwise indicated.

EXAMPLE

Various aluminum nitride powders were prepared by direct nitriding of metallic aluminum for use as a starting powder to make a sintered body. The oxygen content, Si content, purity, and average particle diameter of each powder met the requirements defined herein, i.e., less than 1.8% by weight, not greater than 1.0% by weight, at least about 99%, and up to 3 μm, respectively. Typically the starting aluminum nitride powders have a purity of about 99.8%, an oxygen content of 1.3-1.5%, an Si content of less than 0.1%, and an average particle diameter of 1.9-2.5 μm.

To these powders, a compound of a Group IIa metal and a compound of a Group IIIa metal were added as sintering additives, and the mixtures were ball milled in methanol to give powder mixtures. When a sintered body having a high Si content and/or a high residual oxygen content were prepared for comparative purposes, $Al_2O_3$ powder and/or Si powder was added as required. The addition of these compounds was performed in order to evaluate the effect of the compounds as impurities on the thermal conductivity and other properties of the sintered body.

The amounts of the additives used in the preparation of each powder mixture were so selected that the sintered bodies prepared had the compositions shown in Table 1 below.

The compounds of a Group IIa metal used in this example were in the form of a carbide, carbonate, carboxylate, nitride, carbo-nitride, nitrate, oxalate, hydroxide, sulfate or chloride as shown in Table 1 below. As compounds of a Group IIIa metal, $Y_2O_3$ was used as an yttrium compound and other Group IIIa metals were also used in the form of oxides [$M'_2O_3$] except for Samples Nos. 103 [$YbF_3$] and 111 [$Nd_2(CO_3)_3 \cdot 8H_2O$] in Table 1.

To the resulting powder mixture, 6% by weight of paraffin wax and 2% by weight of stearic acid were added as binders and the mixture was press-molded into a green body of 20 mm in diameter and 5 mm in thickness under a pressure of 1000 kg/cm². The shaped green body was heated for 2 hours at 300° C. in vacuo to remove the binders in the conventional manner, and then baked in a nitrogen atmosphere by pressureless sintering with the time and temperature shown in Table 1 to give a sintered body.

The absolute density of the resulting aluminum nitride sintered body was measured by the Archimedes' method and the relative density was calculated from the measured value. The thermal conductivity was also measured by the laser flash method. These data are also shown in Table 1 together with the compound of a Group IIa metal used, the content of Group IIa metal [M] calculated as an oxide [MO], content of Group IIIa metal [M'] calculated as an oxide [$M'_2O_3$], residual oxygen content, and Si content of the sintered body. Part A of Table 1 shows those cases wherein the Group IIa metal was Ca and the Group IIIa metal was yttrium, while Part B of Table 1 shows the other cases.

The content of Group IIa metal as an oxide and the content of Group IIIa metal as an oxide in each sample of aluminum nitride sintered bodies prepared in the example are plotted in FIG. 1 in which the reference numerals indicate the numbers of the samples in Table 1. The reference numerals in parentheses indicate that the samples are comparative ones. As shown in Table 1 and FIG. 1, in the cases where the Group IIa metal is Ca and the Group IIIa metal is Y (Part A of Table 1), an aluminum nitride sintered body having a high thermal conductivity of greater than 110 W/mK was obtained when all the following requirements were fulfilled; (1) the Ca content as CaO and the Y content as $Y_2O_3$ in the sintered body were within the region confined by lines E-F-G-H-I-J-E in FIG. 1, (2) the residual oxygen content thereof was not greater than 3% by weight, and (3) the Si content thereof was not greater than 0.7% by weight. In the remaining cases (Part B), an aluminum nitride sintered body having high thermal conductivity of greater than 110 W/mK was obtained when the contents of Group IIa and Group IIIa metals as oxides in the sintered body were within the region confined by lines A-B-C-D-A and the residual oxygen content and the Si content thereof were not greater than 5% by weight and not greater than 1.0% by weight, respectively.

TABLE 1

(Part A)

| Sample No. | Ca compound used | Ca content as CaO (wt. %) | Y content as $Y_2O_3$ (wt. %) | Residual oxygen content (wt. %) | Si content (wt. %) | Baking temperature (°C.) | Baking time (hr) | Absolute density (g/cm³) | Relative density (%) | Thermal conductivity (W/mK) |
|---|---|---|---|---|---|---|---|---|---|---|
| 1 | $CaC_2$ | 0.5 | 1.5 | 1.44 | 0.22 | 1650 | 1 | 3.19 | 97.4 | 141 |
| 2 | " | 1.0 | 1.5 | 1.25 | 0.19 | 1680 | 1 | 3.21 | 98.0 | 139 |
| 3 | $CaCO_3$ | 1.0 | 7.0 | 2.7 | 0.07 | 1860 | 0.5 | 3.33 | 99.8 | 116 |
| 4 | " | 0.15 | 1.2 | 1.70 | 0.29 | 1860 | 0.5 | 3.26 | 99.6 | 120 |
| 5 | " | 0.2 | 4.8 | 1.92 | 0.17 | 1860 | 0.5 | 3.21 | 96.9 | 121 |
| 6 | " | 0.5 | 3.0 | 1.16 | 0.08 | 1680 | 1 | 3.26 | 99.0 | 127 |
| 7 | " | 0.5 | 4.8 | 2.32 | 0.03 | 1860 | 0.5 | 3.22 | 97.2 | 120 |

TABLE 1-continued (Part A)

| Sample No. | Ca compound used | Ca content as CaO (wt. %) | Y content as Y₂O₃ (wt. %) | Residual oxygen content (wt. %) | Si content (wt. %) | Baking temperature (°C.) | Baking time (hr) | Absolute density (g/cm³) | Relative density (%) | Thermal conductivity (W/mK) |
|---|---|---|---|---|---|---|---|---|---|---|
| 8 | Ca[CH₃(CH₂)₁₆COO]₂ | 1.0 | 0.3 | 2.48 | 0.01 | 1860 | 0.5 | 3.20 | 98.0 | 121 |
| 9 | " | 1.0 | 0.7 | 1.96 | 0.009 | 1860 | 0.5 | 3.20 | 97.9 | 130 |
| 10 | CaCO₃ | 1.0 | 3.0 | 1.22 | 0.09 | 1700 | 1 | 3.27 | 99.3 | 127 |
| 11 | Ca₃N₂ | 1.0 | 5.0 | 1.66 | 0.11 | 1650 | 1 | 3.29 | 99.2 | 128 |
| 12 | CaCO₃ | 1.0 | 6.8 | 2.23 | 0.06 | 1860 | 0.5 | 3.26 | 97.8 | 121 |
| 13 | " | 1.5 | 1.2 | 1.77 | 0.30 | 1860 | 0.5 | 3.15 | 96.2 | 122 |
| 14 | " | 1.5 | 6.8 | 1.68 | 0.22 | 1860 | 0.5 | 3.23 | 96.8 | 127 |
| 15 | " | 2.0 | 2.0 | 1.78 | 0.04 | 1860 | 0.5 | 3.31 | 100.8 | 113 |
| 16 | CaCN₂ | 2.0 | 2.7 | 1.80 | 0.13 | 1860 | 0.5 | 3.05 | 92.7 | 124 |
| 17 | CaCO₃ | 1.9 | 4.8 | 1.84 | 0.10 | 1860 | 0.5 | 3.11 | 93.8 | 121 |
| 18 | " | 1.9 | 6.8 | 2.20 | 0.07 | 1860 | 0.5 | 3.14 | 94.1 | 120 |
| 19 | " | 2.5 | 3.0 | 2.02 | 0.02 | 1860 | 0.5 | 3.16 | 95.9 | 121 |
| 20 | " | 2.5 | 4.8 | 2.41 | 0.06 | 1860 | 0.5 | 3.09 | 93.2 | 120 |
| 21 | CaCO₃ | 1.5 | 6.0 | 1.23 | 0.13 | 1650 | 1 | 3.27 | 98.3 | 149 |
| 22 | CaC₂ | 1.8 | 2.0 | 0.87 | 0.03 | 1700 | 1 | 3.23 | 98.4 | 157 |
| 23 | CaCO₃ | 0.5 | 7.0 | 1.68 | 0.07 | 1700 | 1 | 3.30 | 98.9 | 117 |
| 24 | CaC₂ | 2.2 | 4.5 | 1.31 | 0.02 | 1750 | 1 | 3.25 | 98.2 | 144 |
| 25* | CaCO₃ | 1.0 | 4.0 | 1.91 | 0.81** | 1700 | 1 | 3.28 | 99.3 | 100 |
| 26* | " | 0.6 | 6.0 | 3.2** | 0.08 | 1750 | 1 | 3.31 | 99.5 | 96 |
| 27* | " | 0.006** | 1.5 | 2.06 | 0.12 | 1800 | 1 | 3.25 | 99.2 | 108 |
| 28* | CaC₂ | 3.1** | 0.5 | 1.88 | 0.03 | 1700 | 0.5 | 3.19 | 97.6 | 104 |
| 29* | CaCO₃ | 2.0 | 0.18** | 1.76 | 0.21 | 1750 | 1 | 3.22 | 98.7 | 104 |
| 30* | " | 0.1 | 12** | 2.70 | 0.04 | 1800 | 0.5 | 3.36 | 99.0 | 101 |

*Comparative Example;
**Outside the range defined herein.

TABLE 1

(Part B)

| Sample No. | Compound of Group IIa metal used | Group IIa metal and its content as MO (wt. %) | Group IIIa metal and its content as M'₂O₃ (wt. %) | Residual oxygen content (wt. %) | Si content (wt. %) | Baking temperature (°C.) | Baking time (hr) | Absolute density (g/cm³) | Relative density (%) | Thermal conductivity (W/mK) |
|---|---|---|---|---|---|---|---|---|---|---|
| 101 | CaCO₃ | Ca : 0.4 | Yb : 6.0 | 1.70 | 0.008 | 1680 | 3 | 3.30 | 97.3 | 157 |
| 102 | CaCN₂ | Ca : 0.03 | Yb : 3.0 | 2.11 | 0.09 | 1600 | 1 | 3.26 | 98.1 | 142 |
| 103 | Sr(NO₃)₂ | Sr : 1.0 | Yb¹⁾ : 0.5 | 2.9 | 0.20 | 1650 | 2 | 3.25 | 99.1 | 129 |
| 104 | Ba(CH₃COO)₂ | Ba : 1.5 | Yb : 0.1 | 4.1 | 0.03 | 1750 | 1 | 3.27 | 99.6 | 118 |
| 105 | CaCO₃ | Ca : 0.5 | Ho : 8.0 | 0.88 | 0.05 | 1700 | 2 | 3.33 | 97.1 | 139 |
| 106 | Ca₃N₂ | Ca : 4.5 | Eu : 1.0 | 2.10 | 0.13 | 1720 | 1 | 3.23 | 98.4 | 112 |
| 107 | CaC₂ | Ca : 0.3 | Dy : 4.0 | 2.3 | 0.87 | 1720 | 1 | 3.30 | 98.8 | 112 |
| 108 | SrCO₃ | Sr : 0.2 | Dy : 0.5 | 0.72 | 0.01 | 1680 | 2 | 3.24 | 99.0 | 151 |
| 109 | SrC₂O₄·H₂O | Sr : 0.1 | Sm : 9.2 | 2.49 | 0.44 | 1800 | 1 | 3.34 | 97.4 | 121 |
| 110 | Ba[CH₃(CH₂)₁₆COO]₂ | Ba : 0.01 | Lu : 0.8 | 1.42 | 0.03 | 1800 | 1 | 3.23 | 98.6 | 116 |
| 111 | Ca(NO₃)₂·4H₂O | Ca : 0.6 | Nd¹⁾ : 5.0 | 2.06 | 0.18 | 1700 | 1 | 3.29 | 98.1 | 144 |
| 112 | CaCO₃ | Ca : 0.8 | Gd : 2.0 | 1.65 | 0.03 | 1700 | 1 | 3.27 | 99.2 | 133 |
| 113 | Ca[CH₃(CH₂)₁₆COO]₂ | Ca : 0.4 | Er : 6.0 | 1.83 | 0.15 | 1680 | 3 | 3.31 | 97.7 | 138 |
| 114* | CaCO₃ | Ca : 0.5 | Ho : 7.0 | 2.10 | 1.08** | 1650 | 2 | 3.17 | 93.1 | 73 |
| 115* | CaC₂ | Ca : 0.4 | Yb : 6.0 | 5.4** | 0.04 | 1680 | 3 | 3.34 | 98.5 | 98 |
| 116* | CaCO₃ | Ca : 0.007** | Dy : 4.0 | 2.05 | 0.08 | 1800 | 1 | 3.27 | 97.9 | 107 |
| 117* | Sr(OH)₂ | Sr : 5.4** | Yb : 1.0 | 1.83 | 0.11 | 1720 | 1 | 3.19 | 95.6 | 101 |
| 118* | BaSO₄ | Ba : 0.5 | Gd : 12.0** | 1.98 | 0.02 | 1800 | 1 | 3.35 | 95.9 | 101 |
| 119* | CaCl₂ | Ca : 1.0 | Yb : 0.006** | 1.76 | 0.14 | 1750 | 1 | 3.22 | 98.7 | 108 |

*Comparative Example;
**Outside the range defined herein.
¹⁾The compounds of group IIIa metals used were metal oxides in the form of (M'₂O₃) except for Sample No. 103 where YbF₃ was used and Sample No. 111 where Nd₂(CO₃)₃·8H₂O was used.

Although the present invention has been described with respect to preferred embodiments, it is to be understood that variations and modifications may be employed without departing from the concept of the invention as defined in the following claims.

What is claimed is:

1. A process for producing an aluminum nitride-based sintered body having a thermal conductivity of greater than 110 W/mK and a relative density of at least 90%, which comprises the steps of:

effecting direct nitriding of aluminum powder and then pulverizing the resulting aluminum nitride powder in a non-oxidizing atmosphere or in an organic solvent to provide an aluminum nitride starting powder having an average particle diameter of no more than 5 μm;

mixing aluminum nitride starting powder produced in said effecting step with at least one additive selected from the group consisting of Group IIa metals of the Periodic Table and compounds of these metals and at least one additive selected from the group consisting of Group IIIa metals and compounds of these metals as sintering additives to form a powder mixture which contains the Group IIa metal and the Group IIIa metal in amounts sufficient to provide a sintered body after the baking step having a Group IIa metal content of from 0.01 to 5.0% by weight calculated as an oxide and a Group IIIa metal content of from 0.01 to 10.0% by weight calculated as an oxide, said aluminum nitride starting powder being prepared by direct nitriding of metallic aluminum powder and having a purity of at least about 99%, an oxygen content of lower than 1.8% by weight, and an Si content of not greater than 1.0% by weight;

shaping the powder mixture; and baking the shaped powder mixture at a temperature in the range of from 1500°–1900° C. in a non-oxidizing atmosphere for a length of time sufficient to sinter the mixture.

2. A process according to claim 1 wherein said Group IIa metal is Ca, Sr, or Ba, and said Group IIIa metal is Y, Yb, Ho, Eu, Dy, Sm, Lu, Nd, Gd, or Er.

3. A process according to claim 1 wherein said Group IIa metal is Ca and said Group IIIa metal is Y.

4. A process according to claim 3 wherein the aluminum nitride-based sintered body obtained has a Ca content of from 0.01 to 2.6% by weight calculated as CaO and a Y content from 0.23 to 9.6% by weight calculated as $Y_2O_3$, the residual oxygen content of the sintered body, which is calculated by subtracting the total amount of oxygen which can be bound to the Ca and Y contents of the sintered body as CaO and $Y_2O_3$, respectively, from the total oxygen content of the sintered body, is not greater than 3.0% by weight, and the Si content thereof is not greater than 0.7% by weight, said sintered body having a thermal conductivity of greater than 110 W/mK and a relative density of at least 92%.

5. A process according to claim 4 wherein the Ca content as CaO and the Y content as $Y_2O_3$ of the sintered body are within the region confined by lines E–F–G–H–I–J–E in FIG. 1.

6. A process according to claim 1, wherein said powder mixture consists essentially of aluminum nitride, said at least one Group IIa metals additive and said at least one Group IIIa metals additive.

7. A process according to claim 1, wherein said aluminum nitride starting powder is pulverized in admixture with said additives.

* * * * *